(12) United States Patent
Foresti et al.

(10) Patent No.: US 8,554,207 B2
(45) Date of Patent: Oct. 8, 2013

(54) PREVENTING ROAMING OF A HOME SUBSCRIBER IN A VISITED NETWORK RESTRICTED FOR ROAMING

(75) Inventors: Franco Foresti, Madrid (ES); Teerapong Sittigultorn, Bangkok (TH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 70 days.

(21) Appl. No.: 13/264,052

(22) PCT Filed: Apr. 22, 2009

(86) PCT No.: PCT/EP2009/054795
§ 371 (c)(1),
(2), (4) Date: Oct. 12, 2011

(87) PCT Pub. No.: WO2010/121654
PCT Pub. Date: Oct. 28, 2010

(65) Prior Publication Data
US 2012/0040667 A1     Feb. 16, 2012

(51) Int. Cl.
*H04W 8/02* (2009.01)
(52) U.S. Cl.
USPC ........................................ 455/432.1; 455/433
(58) Field of Classification Search
USPC .................... 455/410, 411, 432.1, 432.3, 433
See application file for complete search history.

(56) References Cited

U.S. PATENT DOCUMENTS 7,062,270 B1   6/2006  Dalvie et al.

FOREIGN PATENT DOCUMENTS

| EP | 0 788 287 | 8/1997 |
|---|---|---|
| WO | WO 2007/139883 | 12/2007 |
| WO | WO 2008/006399 | 1/2008 |

OTHER PUBLICATIONS

International Search Report for PCT/EP2009/054795, mailed Jan. 18, 2010.
Written Opinion of the International Searching Authority for PCT/EP2009/054795, mailed Jan. 18, 2010.
International Preliminary Report on Patentability for PCT/EP2009/054795, dated Feb. 21, 2011.

*Primary Examiner* — Sam Bhattacharya
(74) *Attorney, Agent, or Firm* — Nixon & Vanderhye P.C.

(57) ABSTRACT

At present, there are operators which perform a Location Update procedure for a subscriber via Local Number Server under invoice agreement with the subscriber himself, and even where the subscriber is roaming in an area without roaming agreement with the subscriber's operator. In this situation, the subscriber's operator loses revenues because it has no roaming agreements with the operator where the subscriber is roaming, whilst the latter gets revenues from the subscriber by using the subscriber's operator Subscriber Identity Module or newer operator's card. To avoid this situation, there is provided a home location server arranged to determine whether roaming restrictions apply for a home subscriber before providing authentication data for said home subscriber and either deny the authentication data for the home subscriber to the requesting entity or apply a charging or billing for the provision of the authentication data for said home subscriber.

15 Claims, 8 Drawing Sheets

PREVENTING ROAMING OF A HOME SUBSCRIBER IN A VISITED NETWORK RESTRICTED FOR ROAMING

This application is the U.S. national phase of International Application No. PCT/EP2009/054795, filed 22 Apr. 2009, which designated the U.S., the entire contents of which is hereby incorporated by reference.

TECHNICAL FIELD

The present invention relates to roaming restrictions. More specifically, the present invention relates to the prevention of roaming where a visited operator's network allows subscriber roaming via Local Number Server and without having roaming agreements with the subscriber's operator.

BACKGROUND

Subscribers of mobile network operators are allowed or not to roam in a specific area depending on roaming agreements with other operators and, in particular, depending on information stored in the subscriber profile.

Generally speaking, where a subscriber attempts to connect to a mobile network owned by an operator lacking a roaming agreement with the operator of said subscriber, and the subscriber thus prevented for roaming therein, the operation 'Update Location' fails and the subscriber cannot make or receive calls other than emergency calls.

At present, there are operators, hereinafter referred to as roamer's operators, which can perform a Location Update procedure for a subscriber via a so-called Local Number Server under an invoice agreement with the subscriber himself. Under this approach, and even where the subscriber is roaming in an area without roaming agreement with the subscriber's operator, the Local Number Server is enabled to produce a Location Update success as Location Update result, providing the roaming subscriber with a temporary own Mobile Station Integrated Services Digital Network number (hereinafter MSISDN) and allowing said subscriber to make and receive calls.

In particular, the Local Number Server (hereinafter LNS) may be enabled to change an unsuccessful Location Update result in a Location Update success, providing to the roaming subscriber a temporary own MSISDN and allowing him to make and receive calls.

This temporary own MSISDN is registered along with other temporary subscription data in a so-called Roaming Location Server (hereinafter RLS) assigned to hold necessary subscriber and subscription data for the roaming subscriber whilst said roaming subscriber is roaming in the area served by said LNS and whilst the invoice agreement with the roaming subscriber is actively valid, that is, whilst the roamer's operator gets incomes from the roaming subscriber for allowing said roaming subscriber make and receive calls in the area served by the LNS.

The RLS assigned to hold necessary subscriber and subscription data for the roaming subscriber behaves as a Home Location Register (hereinafter HLR) or as a Home Subscriber Server (hereinafter HSS) would do in the visited network owned by the roamer's operator, depending on the configuration and services of said visited network; and, likewise, the RLS provides the necessary subscriber and subscription data for the roaming subscriber to any visited serving entity (hereinafter VSE) of a visited network where the subscriber may be allowed to roam, and the VSE thus serving the roaming subscriber.

In this situation, the subscriber's operator loses revenues derived from not having roaming agreements with the roamer's operator, whilst said roamer's operator is getting revenues from the subscriber by using the subscriber's operator Subscriber Identity Module (generally abbreviated as SIM) or a newer generation of operator's card.

SUMMARY

The present invention is aimed, at least, to minimize the above drawback and provides for a new authentication method whereby, upon receipt at a home location server, such as a HLR or a HSS may be, of an authentication data request from a visited serving entity, such as a Visitor Location Register (hereinafter VLR) or a Serving GPRS Server Node (hereinafter SGSN) may be, for a roaming subscriber, the home location server firstly checks roaming restrictions for said subscriber and, where roaming is found to be restricted in the area of said visited serving entity, the home location server prevents the submission of the requested authentication data, so that the subscriber is effectively prevented from roaming in said VLR area.

In accordance with a first aspect of the present invention, there is provided a new method for preventing roaming of a home subscriber in a visited network having roaming restrictions.

This method comprises a step of receiving at a home location server (hereinafter HLS), which holds subscriptions for subscribers of the home network, namely for home subscribers, a request for authentication data for a home subscriber from a VSE of a visited network where the home subscriber is roaming. This method also comprises a step, which is responsive to the reception of the request for authentication data for the home subscriber, of determining at the HLS whether roaming restrictions apply to the visited network where the home subscriber is roaming; and, where roaming restrictions are determined to apply to said visited network which prevent the home subscriber roaming in said visited network, this method also comprises a step of denying the requested authentication data for the home subscriber to the VSE of the visited network where the home subscriber is roaming.

Particularly advantageous in this method, the step of determining whether roaming restrictions apply to the visited network may include a step of verifying whether there is a roaming agreement subscribed with the operator of said visited network. Since different types of roaming agreement may be reached with different operators, an interesting roaming agreement may be reached where the step of verifying whether there is a roaming agreement subscribed with the operator of the visited network includes a step of applying an authentication charging for providing the authentication data and a step of providing the requested authentication data to the VSE. In particular, this charging may be invoiced directly to the home subscriber roaming in the visited network, or might be invoiced as an inter-operator billing to the roamer's operator of the visited network where the home subscriber is roaming.

In order to prevent an overload at the HLS derived from a huge amount of fake subscribers requesting authentication data and thus triggering the checking of roaming restrictions prior to having been authenticated, the step of determining whether roaming restrictions apply to the visited network may include a step of verifying whether the subscriber holds a valid subscription in the HLS for services offered by said VSE. Moreover, in this method and for the same purpose, the step of verifying whether the subscriber holds a valid subscription in the HLS for services offered by the VSE may also include a step of determining whether authentication data already exist or have to be generated for this home subscriber.

On the other hand, deny of authentication data from the HLS to the VSE may be carried out in different manners as those skilled in the art may appreciate. In this respect, and in accordance with an embodiment of the invention, the step of denying the requested authentication data for the home subscriber to VSE may particularly include a step of indicating to the VSE that the home subscriber is unknown to the HLS.

Even though many different criteria may be used to determine whether a home subscriber should be prevented for roaming in certain areas, in accordance with an embodiment of the invention, the step of determining whether roaming restrictions apply to the visited network may include a step of verifying whether at least one amongst the following roaming restriction criteria applies: the visited serving entity is marked as restricted; the home subscriber has international roaming restricted and the visited serving entity is outside the home public land mobile network country; the home subscriber has roaming services restricted and the visited serving entity is outside the home public land mobile network; the home subscriber has roaming services restricted for certain areas and the visited serving entity belongs to one of said certain areas; and the home subscriber has roaming services restricted for certain areas unless an authentication charging is paid for providing authentication data, and the visited serving entity belongs to one of said certain areas.

In accordance with a second aspect of the present invention, there is provided a new HLS holding subscriptions for subscribers of the home network, namely for home subscribers, and comprising: an input unit for receiving a request for authentication data for a home subscriber from VSE of a visited network where the home subscriber is roaming; a processor arranged for determining, as a response to receiving in the input unit of the request for authentication data for the home subscriber, whether roaming restrictions apply to the visited network where the home subscriber is roaming; and, where roaming restrictions are determined by the processor to be applied to said visited network, an output unit arranged for denying the requested authentication data for the home subscriber to the VSE of the visited network where the home subscriber is roaming.

Aligned with the above method and in order to carry out advantageous steps thereof, the processor of this HLS may further be arranged for verifying, whilst determining roaming restrictions to be applied to said visited network, whether there is a roaming agreement subscribed with the operator of said visited network. To this end, depending on the roaming agreement reached with the operator of said visited network, the processor may further be arranged for applying an authentication charging for providing the authentication data.

As for the above method and in order to prevent an overload at the HLS derived from fake subscribers requesting authentication data and thus requiring the checking of roaming restrictions before having been authenticated, the processor may further be arranged for verifying with a home subscriber database, whilst determining roaming restrictions to be applied to said visited network, whether the home subscriber holds a valid subscription in the HLS for services offered by the VSE. To this end and in accordance with an embodiment of the invention, the processor may further be arranged for determining whether authentication data already exist or have to be generated for the home subscriber.

Aligned with the above method, the output unit may further be arranged for indicating to the VSE, whilst denying the requested authentication data for the home subscriber to VSE, that the home subscriber is unknown to the home location server.

As already commented above, different criteria may be used to determine whether a home subscriber should be prevented for roaming in certain areas. To this end, and in accordance with an embodiment of the invention, the processor may further be arranged for verifying in cooperation with the home subscriber database whether at least one amongst the following roaming restriction criteria applies: the visited serving entity is marked as restricted; the home subscriber has international roaming restricted and the visited serving entity is outside the home public land mobile network country; the home subscriber has roaming services restricted and the visited serving entity is outside the home public land mobile network; the home subscriber has roaming services restricted for certain areas and the visited serving entity belongs to one of said certain areas; and the home subscriber has roaming services restricted for certain areas unless an authentication charging is paid for providing authentication data, and the visited serving entity belongs to one of said certain areas.

On the other hand, the invention may be practised by a computer program, in accordance with a third aspect of the invention, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 3 shows an exemplary hybrid configuration of a second generation (2G) network, such as a GPRS network may be considered, and a third generation (3G) network, wherein a mobile subscriber with a user terminal equipped with an appropriate SIM or SIM-like card connects with a SGSN of a GPRS network, or with a so-called Mobility Management Entity (hereinafter MME) of a 3G network, or with a combined MME/SGSN of an hybrid 2G/3G network, and wherein the SGSN, the MME, or the combined MME/SGSN communicates with a HSS to carry out an update location procedure. In particular, as for the above HLR, the HSS may be provided as a monolithic entity or as a distributed entity including a number of HSS front-ends (hereinafter HSS-FE) and a HSS back-end (hereinafter HSS-BE) acting as a centralized common database accessible to every HSS-FE.

FIG. 4 shows a generic architecture enabled to allow or deny roaming of a roaming subscriber in a visited network where said visited network allows the roaming subscriber roaming via the LNS and without having roaming agreements with the subscriber's operator. In particular, this generic architecture shows a HLS which may act as a monolithic or distributed HLR, as well as a monolithic or distributed HSS, as those illustrated in FIG. 1 to FIG. 3, and also shows a VSE which may act as the VLR, the MSC/VLR, the SGSN, the MME, or the combined MME/SGSN as also illustrated in FIG. 1 to FIG. 3. In addition, this generic architecture also includes the RLS commented above, and assigned to hold necessary subscriber and subscription data for the roaming subscriber whilst said roaming subscriber is roaming in the area served by the LNS and whilst the invoice agreement with the roaming subscriber is actively valid.

DETAILED DESCRIPTION

The following describes currently preferred embodiments of means and method for preventing roaming of a home subscriber in a visited network with roaming restrictions.

Figure 5:
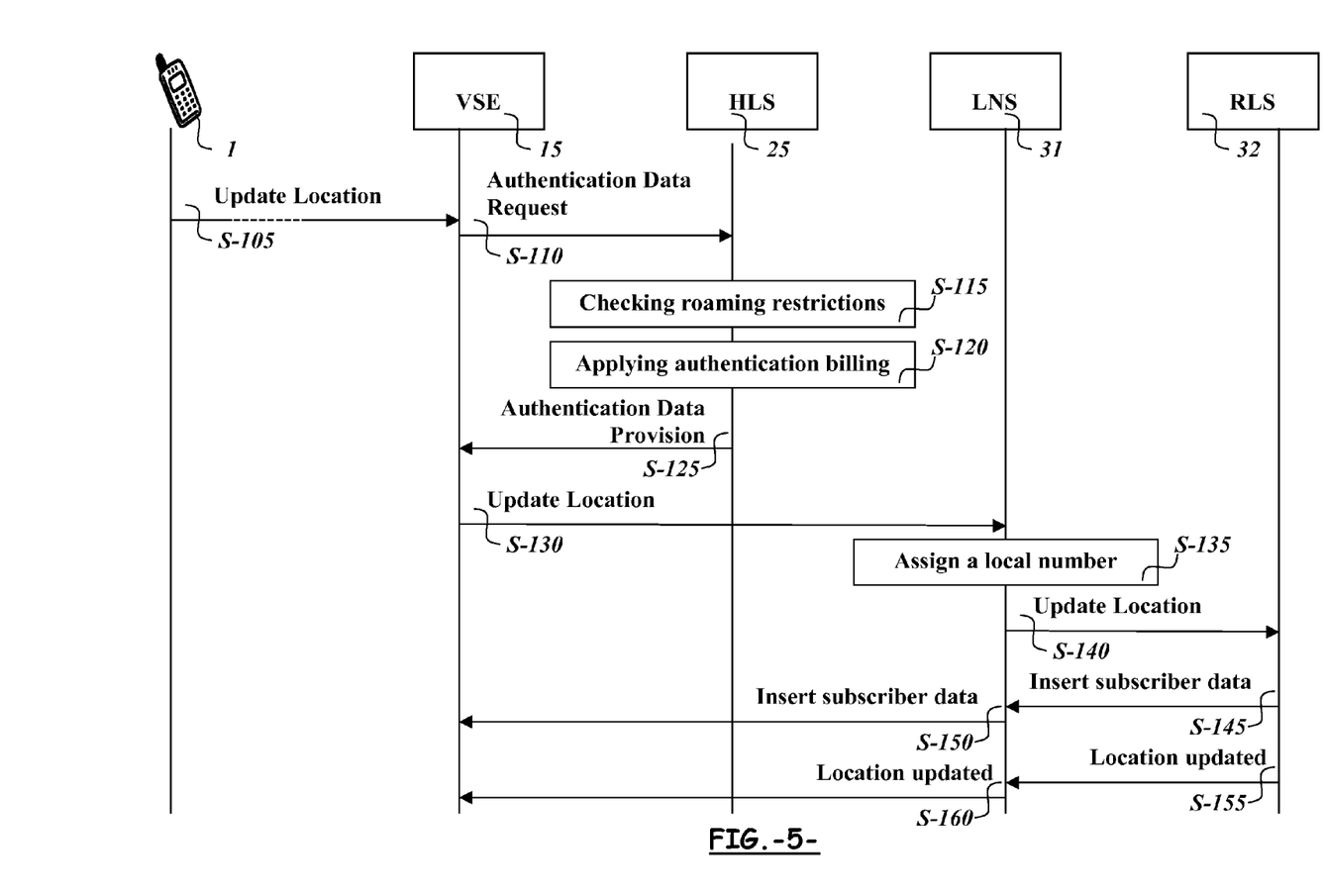
FIG. 5 illustrates a simplified view of the sequence of actions to be performed in accordance with an embodiment of the invention to carry out a method for preventing roaming of a home subscriber in a visited network with roaming restrictions, whereby an authentication billing or charging is applied for providing authentication data for the home subscriber.

FIG. 5 illustrates a first embodiment of the invention whereby an authentication billing or charging is applied for providing authentication data for a home subscriber roaming in a visited network, namely a 'roaming subscriber'. Under this embodiment, as switching on the user equipment 1 of the roaming subscriber, an Update Location procedure is started during a step S-105 towards network entities such as antenna and Base Station of the visited network, which are not illustrated in FIG. 5 for the sake of simplicity, and the Update Location is forwarded thereof towards a VSE 15 of the visited network where the home subscriber is roaming.

The VSE receiving the Update Location, as conventionally accepted by mobile communication systems, firstly requires an authentication of the roaming subscriber and, to this end, submits during a step S-110 an authentication data request for the roaming subscriber towards an HLS 25 holding subscription data for the roaming subscriber in the home network of said roaming subscriber.

Upon receipt of the authentication data request in the HLS 25, and contrary to conventional dictations, the HLS 25 checks during a step S-115 whether roaming restrictions apply for the roaming subscriber in the area served by the VSE.

In particular, the HLS 25 may check whether the VSE 15 is marked in the HLS as restricted; whether the subscriber has the international roaming restriction service activated and the VSE is outside the Home Public Land Mobile Network (hereinafter HPLMN) country; whether the home subscriber has roaming services restricted and the VSE is outside the HPLMN; whether the home subscriber has roaming services restricted for certain areas and the VSE belongs to one of said certain areas; and whether the home subscriber has roaming services restricted for certain areas unless an authentication charging is paid for providing authentication data, and the visited serving entity belongs to one of said certain areas.

Where, as a result of checking during a step S-115 whether roaming restrictions apply for the roaming subscriber, the HLS finds that the home subscriber has roaming services restricted for certain areas unless an authentication charging is paid for providing authentication data, and the visited serving entity belongs to one of said certain areas, the HLS applies during a step S-120 an authentication charging or billing for providing the requested authentication data, and provides during a step S-125 such requested authentication data towards the requester entity, namely the VSE 15.

In particular, the HLS may have as an option a result specifying a tariff to be charged to the home subscriber roaming in the area of the VSE, or to be billed to the roamer's operator owning the VSE.

Once the roaming subscriber has been authenticated in the VSE with the authentication data provided by the HLS, the VSE may trigger an Update Location procedure towards the HLS 25, which is not illustrated in FIG. 5 for the sake of simplicity and which would offer an unsuccessful result, and the VSE receiving such unsuccessful result forwards the Update Location during a step S-130 towards a LNS 31 of the visited network wherein, after having got an invoicing agreement with the roaming subscriber, a local number is assigned to the roaming subscriber during a step S-135. This local number is basically an MSISDN owned by the roamer's operator as commented above when addressing issues aiming the present invention.

Then, the LNS 31 forwards the Update Location during a step S-140 towards a RLS 32, which basically behaves as a conventional HLR or HSS for home subscribers of the visited network as well as for roaming subscribers allowed to roam therein, and which has a sort of default subscriber profile, or customized subscriber profile in accordance with the invoice agreement made with the roaming subscriber, for the roaming subscriber. Upon receipt of the Update Location at the RLS during the step S-140, the RLS 32 downloads subscriber data during a step S-145 for the roaming subscriber towards the LNS 31, and the latter forwards these subscriber data during a step S-150 towards the VSE 15 presently serving the roaming subscriber. Apart from that, the RLS 32 also submits during a step S-155 a successful Update Location back to the LNS, which in turns forwards it back to the VSE during a step S-160. Afterwards, the subscriber with user equipment 1 is enabled to make and receive calls with the assigned local number, namely a local MSISDN.

Figure 8:
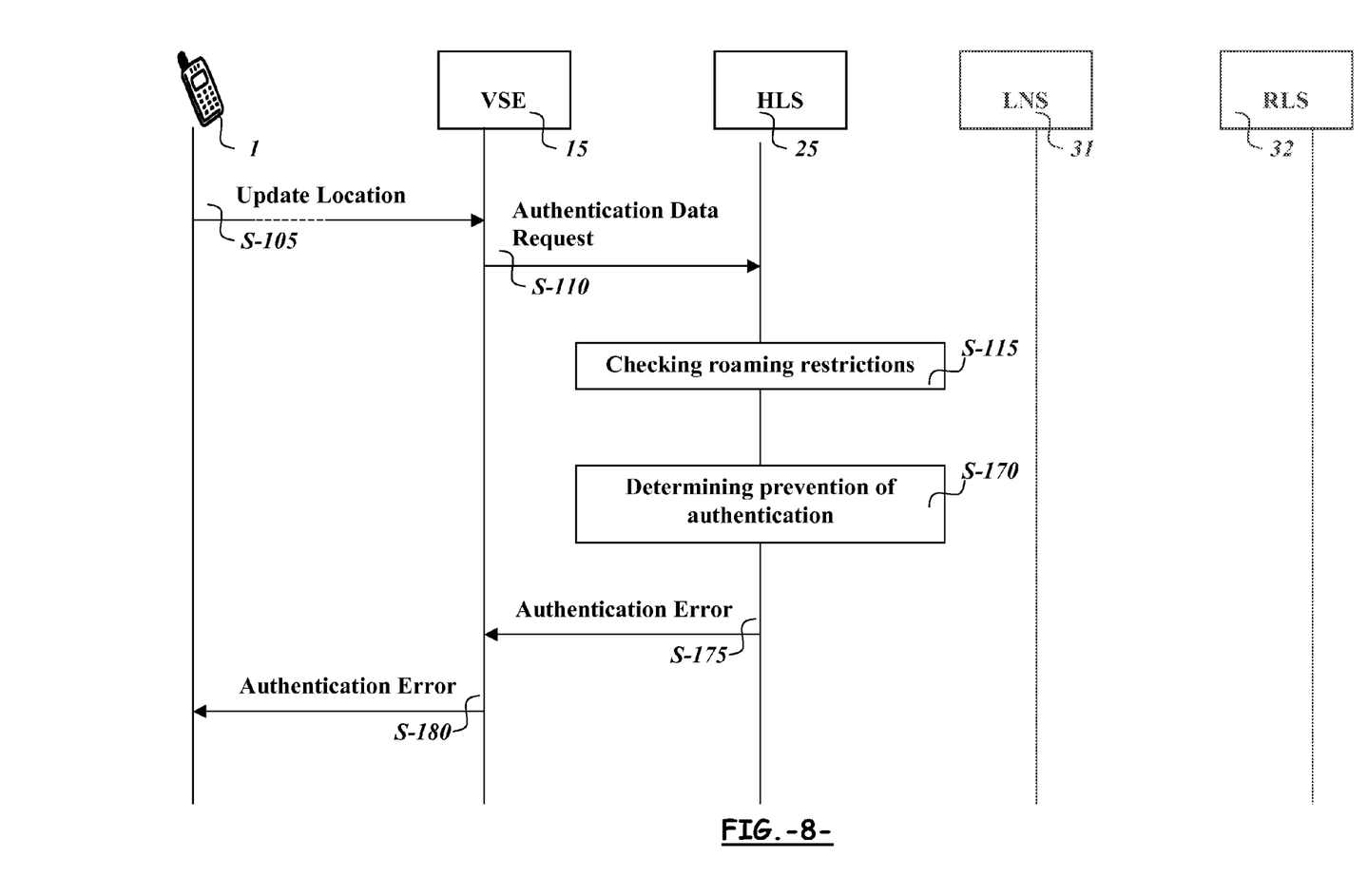
FIG. 8 illustrates a simplified view of the sequence of actions to be performed in accordance with another embodiment of the invention to carry out a method for preventing roaming of a home subscriber in a visited network with roaming restrictions, whereby authentication data requested for the home subscriber from a visited entity are denied.

FIG. 8 illustrates a second embodiment of the invention whereby authentication data requested for a home subscriber roaming in a visited network, namely a 'roaming subscriber', are denied where roaming restrictions are found to apply to said visited network which prevent the home subscriber roaming in said visited network. Under this embodiment, as switching on the user equipment 1 of the roaming subscriber, an Update Location procedure is started during a step S-105 towards network entities such as antenna and Base Station of the visited network, which are not illustrated in FIG. 8 for the sake of simplicity, and the Update Location is forwarded thereof towards a VSE 15 of the visited network where the home subscriber is roaming.

As for a previous embodiment, the VSE receiving the Update Location, and as conventionally accepted by mobile communication systems, firstly requires an authentication of the roaming subscriber and, to this end, submits during a step S-110 an authentication data request for the roaming subscriber towards the HLS 25 holding subscription data for the roaming subscriber in the home network of said roaming subscriber. Upon receipt of the authentication data request in the HLS 25, and contrary to conventional dictations, the HLS 25 checks during a step S-115 whether roaming restrictions apply for the roaming subscriber in the area served by the VSE.

As already commented above, the HLS 25 may check whether the VSE 15 is marked in the HLS as restricted; whether the subscriber has the international roaming restriction service activated and the VSE is outside the Home Public Land Mobile Network (hereinafter HPLMN) country; whether the home subscriber has roaming services restricted and the VSE is outside the HPLMN; whether the home subscriber has roaming services restricted for certain areas and the VSE belongs to one of said certain areas; and whether the home subscriber has roaming services restricted for certain areas unless an authentication charging is paid for providing authentication data, and the visited serving entity belongs to one of said certain areas.

Where, as a result of checking during a step S-115 whether roaming restrictions apply for the roaming subscriber, the HLS finds that the home subscriber has roaming services unconditionally restricted in the area where the VSE belongs to, the HLS determines during a step S-170 the needs for preventing the authentication of the home subscriber in said VSE.

Then, the HLS denies during a step S-175 the provision of authentication data for the home subscriber towards the VSE serving the area where the home subscriber is roaming. In particular, this deny of the authentication data may be carried out by submitting an unsuccessful authentication data result such as an error message or an indication that the roaming subscriber is unknown in the home network.

The VSE receiving such deny of authentication data cannot authenticate the user and has to prevent the roaming of the roaming subscriber in its own visited network so that the VSE submits during a step S-180 a corresponding authentication error to the roaming subscriber.

Figure 1:
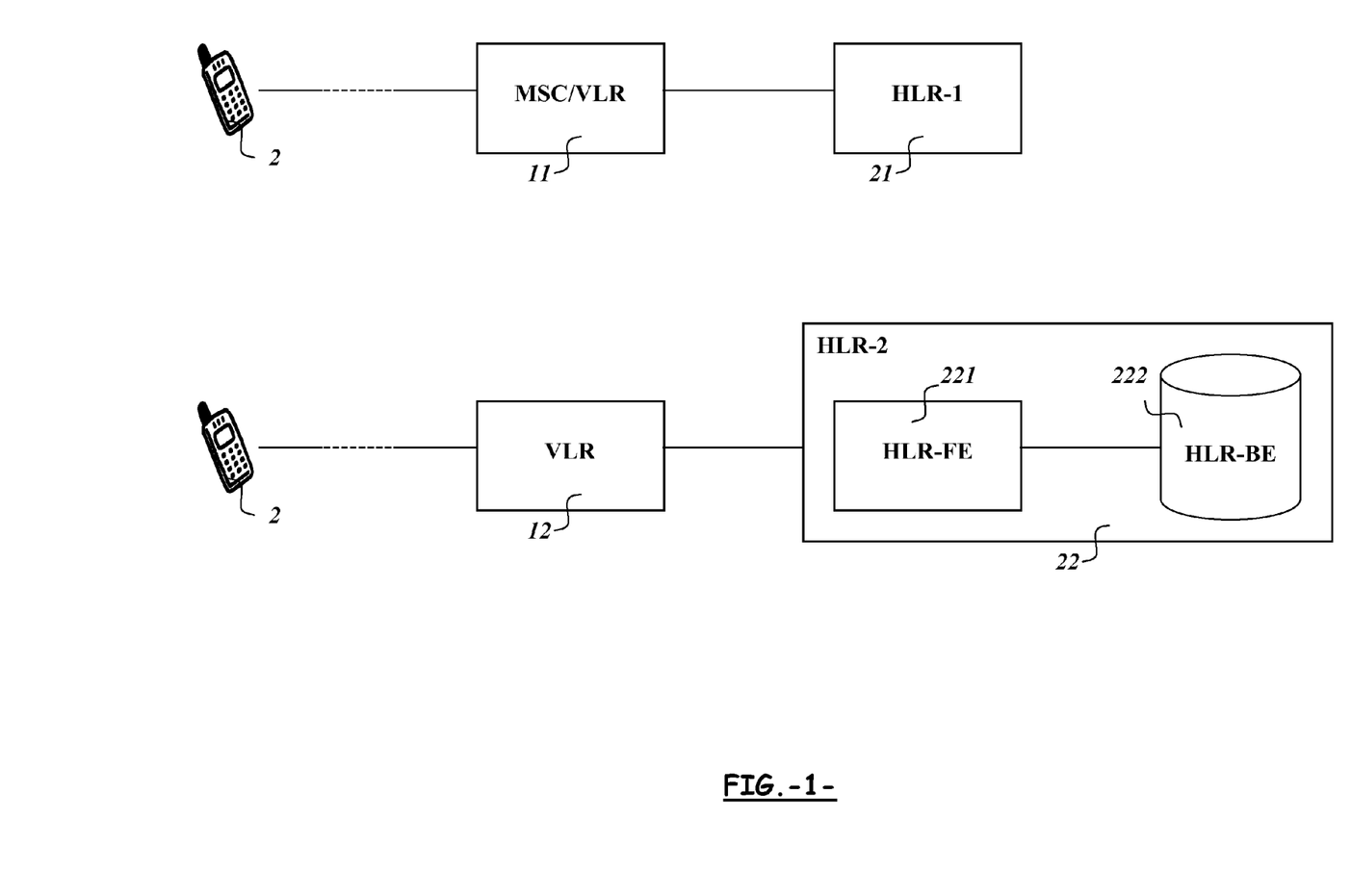
FIG. 1 shows a simplified view of two exemplary GSM architectures wherein a mobile subscriber with a user terminal equipped with a GSM SIM connects with a VLR of a GSM network and the VLR communicates with a HLR to carry out an update location procedure. In particular, the VLR may be provided in a stand-alone configuration or combined with a Mobile Switching Centre (hereinafter MSC), combination which is generally referred to as an MSC/VLR. Also in particular, the HLR may be provided as a monolithic entity or as a distributed entity including a number of HLR front-ends (hereinafter HLR-FE) and a HLR back-end (hereinafter HLR-BE) acting as a centralized common database accessible to every HLR-FE.
Figure 2:
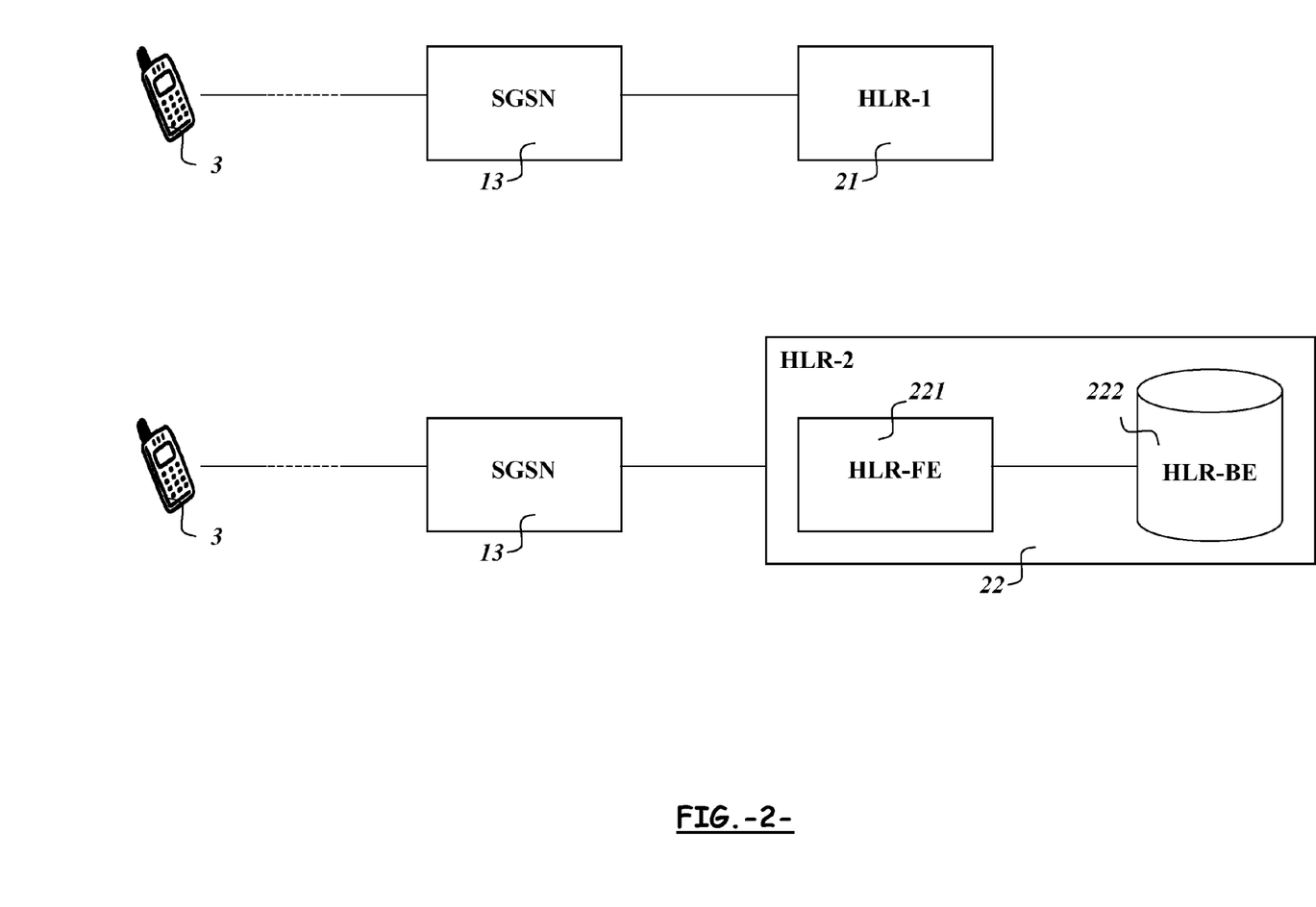
FIG. 2 shows a simplified view of two exemplary GPRS architectures wherein a mobile subscriber with a user terminal equipped with a GPRS SIM connects with a SGSN of a GPRS network and the SGSN communicates with a HLR to carry out an update location procedure. In particular, the HLR may be provided as a monolithic entity or as a distributed entity including a number of HLR front-ends (hereinafter HLR-FE) and a HLR back-end (hereinafter HLR-BE) acting as a centralized common database accessible to every HLR-FE.
Figure 3:
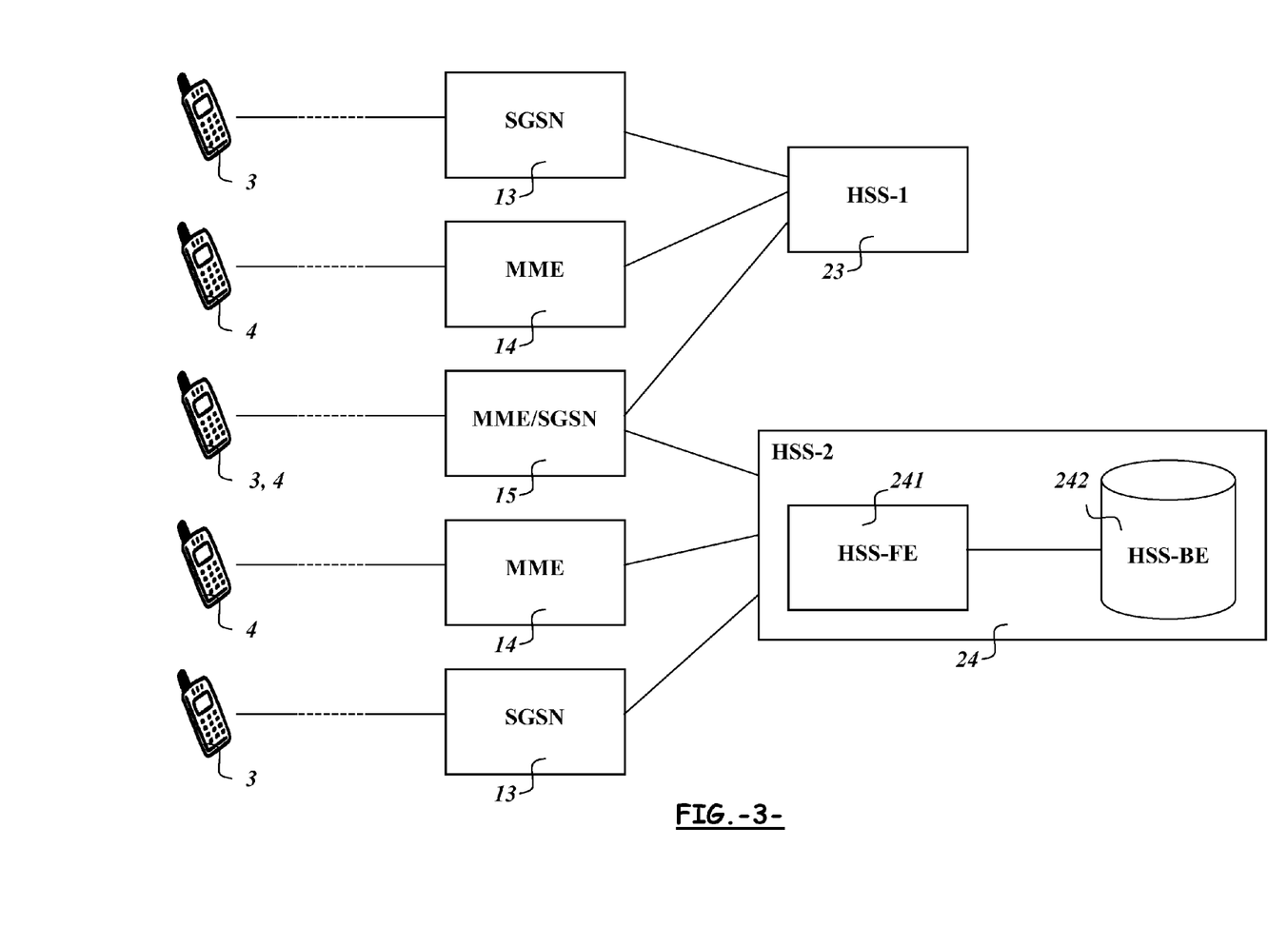
Figure 4:
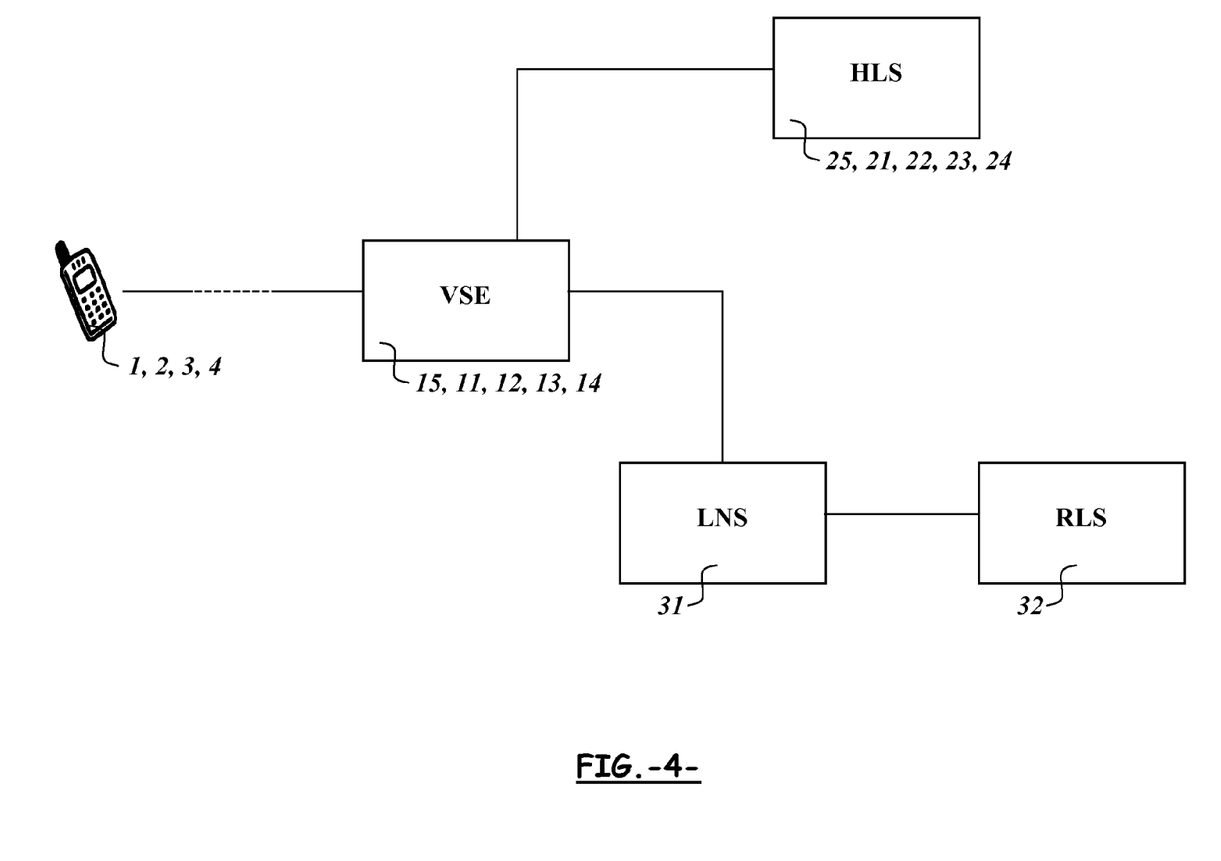
Figure 6:
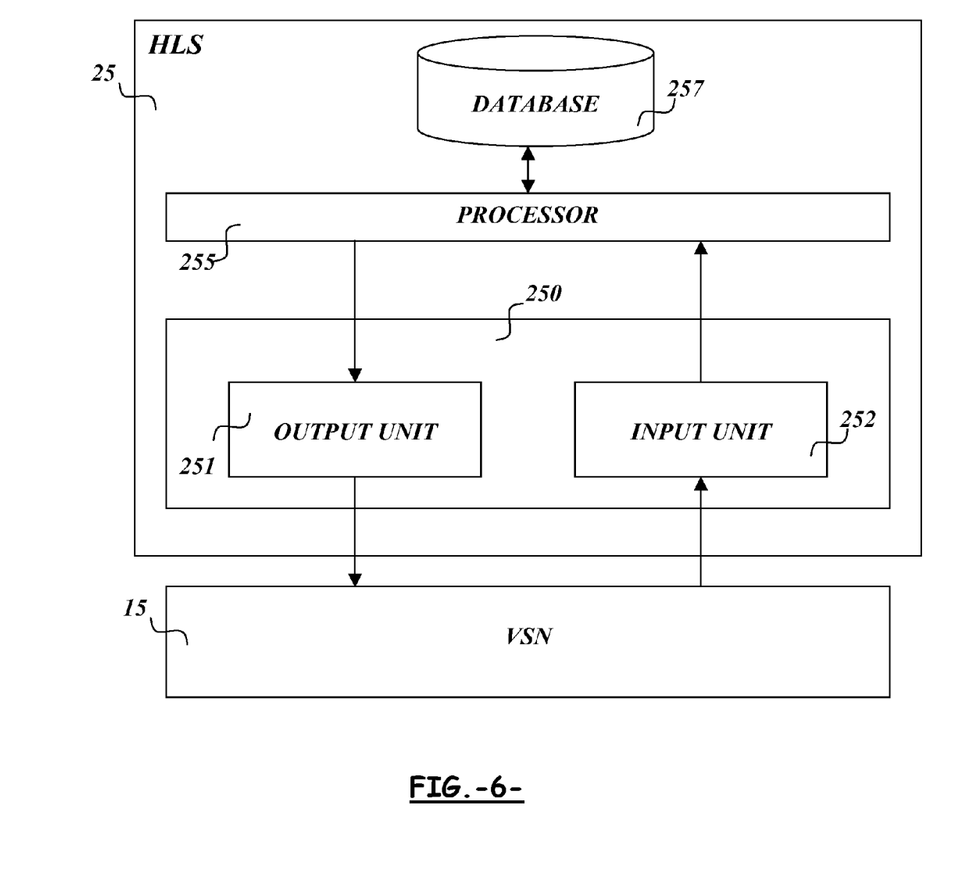
FIG. 6 illustrates an exemplary implementation of a HLS suitable for acting as a monolithic HLR or HSS and arranged for preventing roaming of a home subscriber in a visited network with roaming restrictions.
Figure 7:
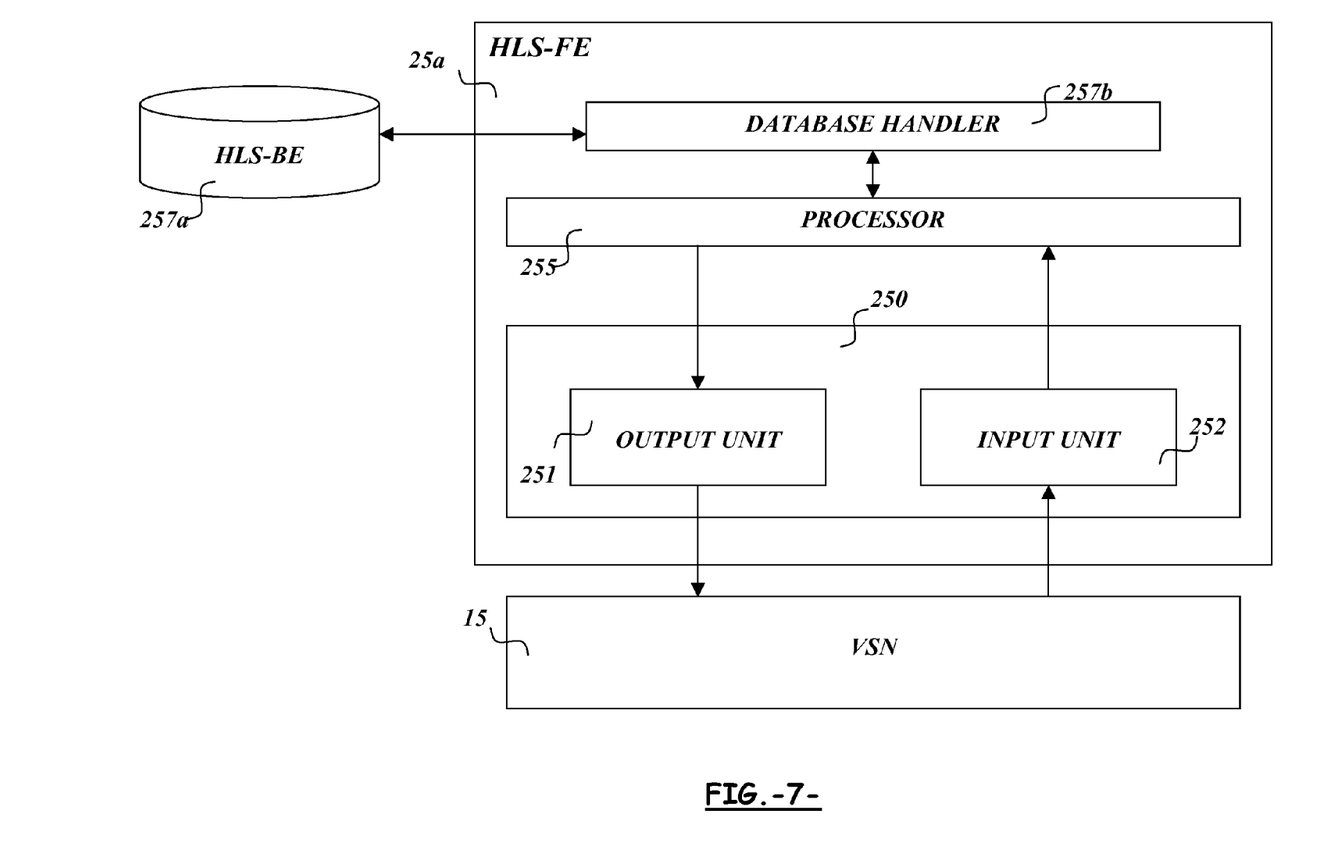
FIG. 7 illustrates an exemplary implementation of a HLS suitable for acting as a distributed HLR or HSS, each one having a number of respective HLR-FE or HSS-FE and sharing an externally centralized common database accessible to every HLR-FE or HSS-FE; and the HLS arranged for preventing roaming of a home subscriber in a visited network with roaming restrictions.

To this end, there is provided a HLS 25, as illustrated in FIG. 6 and suitable for acting as a monolithic HLR 21 or HSS 23 respectively illustrated in FIG. 1 to FIG. 3, and there is provided a coupled HLS front-end (hereinafter HLS-FE) 25a implementing the HLS logic and HLS back-end (hereinafter HLS-BE) 257a implementing a centralized common database, as illustrated in FIG. 7 and suitable for acting as a distributed HLR or HSS as commented above. The HLS 25 and the coupling HLS-FE 25a with HLS-BE 257a, being both arranged for carrying out the above method in accordance with the above two embodiments alone or in combination.

As illustrated in FIG. 6 and FIG. 7, there are respectively provided a HLS 25 and a coupling HLS-FE 25a with HLS-BE 257a, both arrangements in FIG. 6 and FIG. 7 comprising: an input unit 252 for receiving the request for authentication data for the home subscriber from the VSE 15 of the visited network where the home subscriber is roaming; a processor 255 that, responsive to the reception in the input unit 252 of the request for authentication data for the home subscriber, is arranged for determining whether roaming restrictions apply to the visited network where the home subscriber is roaming; and an output unit 251 that, where roaming restrictions are determined by the processor 255 to be applied to said visited network, is arranged for denying the requested authentication data for the home subscriber to the VSE 15 of the visited network where the home subscriber is roaming. In particular, the input unit 252 and the output unit 251 both may be provided as integral parts of an input/output unit 250.

As already commented, the processor 255 may further be arranged for verifying, in both arrangements shown in FIG. 6 and FIG. 7, whilst determining roaming restrictions to be applied to said visited network, whether there is a roaming agreement subscribed with the operator of said visited network. In particular, where no roaming agreement exists with the operator of said visited network, the processor 255 may further be arranged for applying an authentication charging for providing the authentication data. This charging may be invoiced to the home subscriber roaming in the visited area or, in the form of operator's billing, to the roamer's operator owning the visited network where the home subscriber, depending on local operator policies and agreements subscribed between operators.

Moreover, whilst determining whether roaming restrictions apply to the visited network, the processor 255 may further be arranged for verifying with a home subscriber database whether the home subscriber holds a valid subscription in the HLS 25 for services offered by the VSE 15. Furthermore, whilst verifying with the home subscriber database the valid subscription of the home subscriber, the processor 255 may further be arranged for determining whether authentication data already exist or have to be generated for the home subscriber.

In this respect, these verifications may be of relevance to avoid overloads in the HLS derived from checking roaming restrictions for subscribers who have not been authenticated yet, and who might be fake subscribers triggering costly processing in the HLS.

In particular, the home subscriber database may be provided as an internal database 257 communicated with the processor 255 of the HLS 25 and as an integral part of the latter, as illustrated in FIG. 6, or may be provided as an external data base 257a communicated with the processor 255 of the HLS-FE 25a through a database handler 257b included in said HLS 25a, as FIG. 7 illustrates. In this respect, where the HLS 25 includes the internal database 257, such HLS is suitable for acting as a monolithic HLR or HSS as already commented above and illustrated in FIG. 1 to FIG. 3; whereas the external database 257a may be considered a HLS-BE coupled with the HLS-FE 25a, and this arrangement being thus suitable for acting as a centralized common database, namely a HLR-BE or HSS-BE, accessible to a plurality of HLR-FE and HSS-FE illustrated in FIG. 1 to FIG. 3.

In order to accomplish other advantageous features of the above method, the output unit 251 of both arrangements shown in FIG. 6 and FIG. 7 may further be arranged for indicating to the VSE 15, whilst denying the requested authentication data for the home subscriber to said VSE, that the home subscriber is unknown to the HLS 25.

Moreover, also in order to accomplish other advantageous features of the above method and whilst determining roaming restrictions to be applied to said visited network, the processor 255 of the HLS 25 or the HLS 25*a* respectively illustrated in FIG. 6 and FIG. 7 may further be arranged for verifying in cooperation with the internal home subscriber database 257 of FIG. 6, as well as with the external home subscriber database 257*a* via the internal database handler 257*b* of FIG. 7, whether at least one amongst the following roaming restriction criteria applies: the visited serving entity is marked as restricted; the home subscriber has international roaming restricted and the visited serving entity is outside the home public land mobile network country; the home subscriber has roaming services restricted and the visited serving entity is outside the home public land mobile network; the home subscriber has roaming services restricted for certain areas and the visited serving entity belongs to one of said certain areas; and the home subscriber has roaming services restricted for certain areas unless an authentication charging is paid for providing authentication data, and the visited serving entity belongs to one of said certain areas.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for preventing roaming of a home subscriber in a visited network having roaming restrictions, the method comprising the steps of:
   receiving at a home location server, which holds subscriptions for home subscribers of the home network, a request for authentication data for a home subscriber from a visited serving entity of a visited network where the home subscriber is roaming;
   in response to the request for authentication data and prior to receiving a location updating message for the home subscriber at the home location server, determining at the home location server whether roaming restrictions apply to the visited network where the home subscriber is roaming; and
   where roaming restrictions are determined to apply to said visited network which prevent the home subscriber roaming in said visited network, denying the requested authentication data for the home subscriber to the visited serving entity of the visited network in order to prevent the home subscriber from roaming in the visited network.

2. The method of claim 1, wherein the step of determining whether roaming restrictions apply to said visited network includes a step of verifying whether there is a roaming agreement subscribed with the operator of said visited network.

3. The method of claim 2, wherein the step of verifying whether there is a roaming agreement subscribed with the operator of said visited network includes a step of applying an authentication charging for providing the authentication data and a step of providing the requested authentication data to the visited serving entity.

4. The method of claim 1, wherein the step of determining whether roaming restrictions apply to said visited network includes a step of verifying whether the subscriber holds a valid subscription in the home location server for services offered by said visited serving entity.

5. The method of claim 4, wherein the step of verifying whether the subscriber holds a valid subscription in the home location server for services offered by said visited serving entity includes a step of determining whether authentication data already exist or have to be generated for the home subscriber.

6. The method of claim 1, wherein the step of denying the requested authentication data for the home subscriber to the visited serving entity includes a step of indicating to said visited serving entity that the home subscriber is unknown to the home location server.

7. The method of claim 1, wherein the step of determining whether roaming restrictions apply to said visited network includes a step of verifying whether at least one amongst the following roaming restriction criteria applies:
   the visited serving entity is marked as restricted;
   the home subscriber has international roaming restricted and the visited serving entity is outside the home public land mobile network country;
   the home subscriber has roaming services restricted and the visited serving entity is outside the home public land mobile network;
   the home subscriber has roaming services restricted for certain areas and the visited serving entity belongs to one of said certain areas; and
   the home subscriber has roaming services restricted for certain areas unless an authentication charging is paid for providing authentication data, and the visited serving entity belongs to one of said certain areas.

8. A home location server, which holds subscriptions for home subscribers of the home network, comprising:
   an input unit for receiving a request for authentication data for a home subscriber from a visited serving entity of a visited network where the home subscriber is roaming;
   a processor configured, in response to the reception in the input unit of the request for authentication data and prior to receiving a location updating message for the home subscriber, to determine whether roaming restrictions apply to the visited network where the home subscriber is roaming; and
   an output unit configured, and where roaming restrictions are determined by the processor to be applied to said visited network, to deny the requested authentication data for the home subscriber to the visited serving entity of the visited network in order to prevent the home subscriber from roaming in the visited network.

9. The home location server of claim 8, wherein the processor is further configured to verify, while determining roaming restrictions to be applied to said visited network, whether there is a roaming agreement subscribed with the operator of said visited network.

10. The home location server of claim 9, wherein, upon verifying whether there is a roaming agreement with the operator of said visited network, the processor is further configured to apply an authentication charging for providing the authentication data.

11. The home location server of claim 8, wherein the processor is further configured to verifying with a home subscriber database, while determining roaming restrictions to be applied to said visited network, whether the home subscriber holds a valid subscription in the home location server for services offered by said visited serving entity.

12. The home location server of claim 11, wherein the processor is further configured to determine, while verifying with the home subscriber database the valid subscription of the home subscriber for services offered by said visited serving entity, whether authentication data already exist or have to be generated for the home subscriber.

13. The home location server of claim 8, wherein the output unit is further configured to indicate to the visited serving entity, while denying the requested authentication data for the home subscriber to said visited serving entity, that the home subscriber is unknown to the home location server.

14. The home location server of claim 8, wherein the processor is further configured to verify in cooperation with the home subscriber database, while determining roaming restrictions to be applied to said visited network, whether at least one amongst the following roaming restriction criteria applies:

the visited serving entity is marked as restricted;

the home subscriber has international roaming restricted and the visited serving entity is outside the home public land mobile network country;

the home subscriber has roaming services restricted and the visited serving entity is outside the home public land mobile network;

the home subscriber has roaming services restricted for certain areas and the visited serving entity belongs to one of said certain areas; and the home subscriber has roaming services restricted for certain areas unless an authentication charging is paid for providing authentication data, and the visited serving entity belongs to one of said certain areas.

15. A computer program stored in a non-transitory computer-readable storage medium which, when executed by a computer, carries out the method steps according to claim 1.

* * * * *